United States Patent Office 3,371,132
Patented Feb. 27, 1968

3,371,132
O - ALKYL O(S) - (N - ALKOXY - N - ALKYL-
CARBAMYL METHYL) PHENYL (THIOLO)
(THIONO)PHOSPHONATES
Sidney B. Richter, Chicago, Ill., assignor to Velsicol
Chemical Corporation, Chicago, Ill., a corporation of
Illinois
No Drawing. Filed Sept. 8, 1964, Ser. No. 395,060
7 Claims. (Cl. 260—943)

ABSTRACT OF THE DISCLOSURE

A compound of the formula

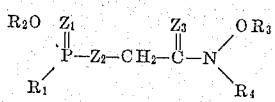

wherein $R_1$ is aryl; $R_2$, $R_3$, and $R_4$ are independently selected alkyl groups; and $Z_1$, $Z_2$ and $Z_3$ are independently selected from the group consisting of sulfur and oxygen. A herbicidal, insecticidal and miticidal composition comprising an inert carrier and a toxic quantity of the above described compound. A method of the control of undesirable plant life, insects and mites which comprises applying a toxic quantity of the above described herbicidal, insecticidal, and miticidal composition.

---

This invention relates to new chemical compositions of matter. More particularly, this invention relates to new chemical compounds of the formula:

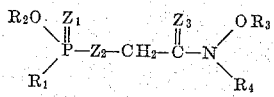

wherein $R_1$ is aryl; $R_2$, $R_3$, and $R_4$ are independently selected alkyl groups; and $Z_1$, $Z_2$, and $Z_3$ are independently selected from the group consisting of sulfur and oxygen. In a preferred embodiment of this invention, $R_1$ is selected from the group consisting of unsubstituted aryl and substituted aryl wherein the substituents are selected from the group consisting of alkyl, halogen and mixtures thereof; $R_2$, $R_3$, and $R_4$ are independently selected alkyl groups containing 1 to 10 carbon atoms; and $Z_1$, $Z_2$, and $Z_3$ are independently selected from the group consisting of sulfur and oxygen. In a further preferred embodiment, $R_1$ is selected from the group consisting of unsubstituted aryl containing 6 to 10 carbon atoms and substituted aryl wherein the substituents are selected from the group consisting of alkyl containing 1 to 10 carbon atoms, halogen and mixtures thereof; $R_2$, $R_3$ and $R_4$ are independently selected alkyl groups containing 1 to 4 carbon atoms; and $Z_1$, $Z_2$, and $Z_3$ are independently selected from the group consisting of sulfur and oxygen. These new compounds are useful as herbicides and relate to the control of undesirable plant life and also as insecticides and miticides and relate to the control of insects and mites.

The new compounds of this invention can be prepared readily by reacting an N-alkyl-N-alkoxy haloacetamide with a metal or ammonium salt of the appropriate phosphonic acid or its derivatives, said compound having the formula $(R_2O)(R_1)P(Z_1)Z_2M$ wherein $R_1$, $R_2$, $Z_1$, and $Z_2$ are as described above and M is a metal such as potassium, sodium and the like or ammonium. The reaction is advantageously carried out in an inert organic solvent such as benzene, ether, dioxane, or tetrahydrofuran. The reaction takes place either upon standing at room temperature or, if desired, the reaction mixture can be warmed up to reflux in order to bring the reaction to completion in a shorter period of time. It is desirable to employ an amount of amide about equimolar with the amount of salt although an excess of either the salt or the amide can be used.

The N-alkyl-N-alkoxy haloacetamides can be prepared from the corresponding amine hydrochlorides having the formula $HN(OR_3)(R_4) \cdot HCl$, wherein $R_3$ and $R_4$ are as described above, which in turn can be prepared, if necessary, by the technique described by Jones and Major, J.A.C.S., vol. 52, pp. 669–79 (1930). A procedure for the preparation of the amide from the amine is to add the amine hydrochloride to a mixture of an organic solvent, such as dichloroethane, and sodium hydroxide dissolved in water, with stirring and cooling on a Dry Ice-acetone or Dry Ice-isopropanol bath. A molar amount of sodium hydroxide is used which is about double the molar concentration of amine hydrochloride. The reaction mixture is cooled until the temperature is down to −10° C. to −15° C., and then chloroacetyl chloride is added in an amount about 10% in excess of the amount of amine hydrochloride employed. The temperature of the reaction mixture is allowed to rise to room temperature and the N-alkyl-N-alkoxy haloacetamide is recovered and purified by methods common to the art. Exemplary of amides useful in the preparation of the new compounds of the present invention are:

N-methoxy-N-isopropyl-α-chloroacetamide,
N-methoxy-N-isopropyl-α-bromoacetamide,
N-methoxy-N-methyl-α-chloroacetamide,
N-methoxy-N-ethyl-α-chloroacetamide,
N-methoxy-N-n-propyl-α-chloroacetamide,
N-methoxy-N-n-butyl-α-chloroacetamide,
N-methoxy-N-sec-butyl-α-chloroacetamide,
N-methoxy-N-tert-butyl-α-chloroacetamide,
N-methoxy-N-pentyl-α-chloroacetamide,
N-methoxy-N-hexyl-α-chloroacetamide,
N-methoxy-N-heptyl-α-chloroacetamide,
N-methoxy-N-octyl-α-chloroacetamide,
N-methoxy-N-nonyl-α-chloroacetamide,
N-methoxy-N-decyl-α-chloroacetamide,
N-ethoxy-N-ethyl-α-chloroacetamide,
N-ethoxy-N-n-propyl-α-chloroacetamide,
N-ethoxy-N-isopropyl-α-chloroacetamide,
N-n-propoxy-N-ethyl-α-chloroacetamide,
N-n-propoxy-N-n-propyl-α-chloroacetamide,
N-n-propoxy-N-isopropyl-α-chloroacetamide,
N-isopropoxy-N-ethyl-α-chloroacetamide,
N-isopropoxy-N-n-propyl-α-chloroacetamide,
N-isopropoxy-N-isopropyl-α-chloroacetamide,
N-butoxy-N-isopropyl-α-chloroacetamide,
N-pentoxy-N-isopropyl-α-chloroacetamide,
N-hexoxy-N-isopropyl-α-chloroacetamide,
N-heptoxy-N-isopropyl-α-chloroacetamide,
N-octoxy-N-isopropyl-α-chloroacetamide,
N-nonoxy-N-isopropyl-α-chloroacetamide,
N-decoxy-N-isopropyl-α-chloroacetamide, and the like.

The metal salts of phosphonic acids or their derivatives which are used in the preparation of the compounds of the present invention have the formula:

wherein $R_1$, $R_2$, $Z_1$, and $Z_2$, and M are as heretofore described. These salts can be prepared by the methods described by Malatesta and Pizzotti, Chimica e Industria (Milan) 27, 6–10 (1945), and Melnikov and Grapov, Zhur. Vsesoyuz Khim. Obshchestva in D. I. Mendeleeva, 6, No. 1; 119–20 (1961). Exemplary of suitable salts are:

potassium methyl phenylthiolothionophosphonate,
potassium ethyl phenylthiolothionophosphonate,
potassium n-propyl phenylthiolothionophosphonate,
potassium isopropyl phenylthiolothionophosphonate, potassium n-butyl phenylthiolothionophosphonate,
potassium sec-butyl phenylthiolothionophosphonate,
potassium tert-butyl phenylthiolothionophosphonate,
potassium pentyl phenylthiolothionophosphonate,
potassium hexyl phenylthiolothionophosphonate,
potassium cyclohexyl phenylthiolothionophosphonate,
potassium heptyl phenylthiolothionophosphonate,
potassium octyl phenylthiolothionophosphonate,
potassium nonyl phenylthiolothionophosphonate,
potassium decyl phenylthiolothionophosphonate,
potassium ethyl 4-chlorophenylthiolothionophosphonate,
potassium ethyl 2,4-dichlorophenylthiolothionophosphonate,
potassium ethyl 2,4-dimethylphenylthiolothionophosphonate,
potassium ethyl 2-methyl-4-chlorophenylthiolothionophosphonate,
potassium ethyl phenylphosphonate,
potassium n-propyl phenylphosphonate,
potassium isopropyl phenylphosphonate,
potassium ethyl phenylthionophosphonate,
potassium n-propyl phenylthionophosphonate,
potassium isopropyl phenylthionophosphonate,
potassium ethyl phenylthiolophosphonate,
potassium n-propyl phenylthiolophosphonate,
potassium isopropyl phenylthiolophosphonate, and the like.

It would be equally suitable to use other salts such as sodium or ammonium salts of these compounds.

The preparation of the novel compounds of this invention is more particularly described in the following examples.

EXAMPLE 1

O-*methyl* S-(N-*methoxy*-N-*isopropylcarbamylmethyl*) *phenylthiolothionophosphonate*

Potassium methyl phenylthiolothionophosphonate (12 g.; 0.05 mole) was added to a solution of N-methoxy-N-isopropyl-α-chloroacetamide (8 g.; 0.05 mole) dissolved in benzene (100 ml.). This reaction mixture was refluxed, with stirring, overnight. The mixture was then cooled and the potassium chloride precipitate was filtered off and washed with benzene. The filtrate was washed three times with water and dried over magnesium sulfate. The solvent was removed by evaporation in vacuo to yield 12.5 g. of O-methyl S-(N-methoxy-N-isopropylcarbamylmethyl) phenylthiolothionophosphonate, a colorless liquid having a refractive index $n_D^{25}$ 1.5720.

Analysis for $C_{13}H_{20}NO_3PS_2$—Theory: N, 4.2%; P, 8.9%; S, 18.9%. Found: N, 4.2%; P, 9.3%; S, 19.2%.

EXAMPLE 2

O-*ethyl* S-(N-*methoxy*-N-*isopropylcarbamylmethyl*) *phenylthiolothionophosphonate*

Potassium ethyl phenylthiolothionophosphonate (6 g.; 0.234 mole) was added to a solution of N-methoxy-N-isopropyl-α-chloroacetamide (4 g.; 0.234 mole) dissolved in benzene (100 ml.). This reaction mixture was refluxed, with stirring, overnight. The mixture was then cooled and the potassium chloride precipitate was filtered off and washed with benzene. The filtrate was washed twice with water and once with a saturated sodium chloride solution and dried over magnesium sulfate. The solution was then filtered and the solvent was removed from the filtrate by evaporation in vacuo. A slight turbidity was filtered out with supercel to yield 6 g. of O-ethyl S-(N-methoxy - N - isopropylcarbamylmethyl) phenylthiolothionophosphonate, a colorless liquid having a refractive index $n_D^{20}$ 1.5615.

Analysis for $C_{14}H_{22}NO_3PS_2$—Theory: N, 4.19%; P, 8.32%; S, 17.15%. Found: N. 4.04%; P, 8.95%; S, 18.50%.

EXAMPLE 3

O-*n-propyl* S-(N-*methoxy*-N-*isopropylcarbamylmethyl*) *phenylthiolothionophosphonate*

Potassium n - propyl phenylthiolothionophosphonate (135 g.; 0.05 mole) was added to a solution of N-methoxy-N-isopropyl-α-chloroacetamide (8 g.; 0.05 mole) dissolved in benzene (100 ml.). This reaction mixture was refluxed, with stirring, overnight. The mixture was then cooled and the potassium chloride precipitate was filtered off and washed with benzene. The filtrate was washed three times with water and dried over magnesium sulfate. The solution was then filtered and the solvent was removed from the filtrate by evaporation in vacuo to yield 16.5 g. of O-n-propyl S-(N-methoxy-N-isopropylcarbamylmethyl) phenylthiolothionophosphonate, a colorless liquid having a refractive index $n_D^{22}$ 1.5587.

Analysis for $C_{15}H_{24}NO_3PS_2$—Theory: N, 4.0%; P, 8.3%; S, 17.2%. Found: N, 3.9%; P, 8.6%; S, 17.8%.

EXAMPLE 4

O-*isopropyl* S-(N-*methoxy*-N-*isopropylcarbamylmethyl*) *phenylthiolothionophosphonate*

Potassium isopropyl phenylthiolothionophosphonate (135 g.; 0.05 mole) was added to a solution of N-methoxy-N-isopropyl-α-chloroacetamide (8 g.; 0.05 mole) dissolved in benzene (100 ml.). This reaction mixture was refluxed, with stirring, overnight. The mixture was then cooled and the potassium chloride precipitate was filtered off and washed with benzene. The filtrate was washed three times with water and dried over magnesium sulfate. The solution was then filtered and the solvent was removed from the filtrate by evaporation to yield 16.5 g. of O - isopropyl S - (N - methoxy-N-isopropylcarbamylmethyl) phenylthiolothionophosphonate, a colorless liquid having a refractive index $n_D^{26}$ 1.5523.

Analysis for $C_{15}H_{24}NO_3PS_2$—Theory: N, 4.0%; P, 8.2%; S, 16.8%. Found: N, 3.9%; P, 8.6%; S, 17.8%.

EXAMPLE 5

O-*ethyl* S-(N-*methoxy*-N-*methylcarbamylmethyl*) *phenylthiolothionophosphonate*

Potassium ethyl phenylthiolothionophosphonate (13 g.; 0.05 mole) was added to a solution of N-methoxy-N-methyl-α-chloroacetamide dissolved in benzene (100 ml.). This reaction mixture was refluxed with stirring, overnight. The mixture was then cooled and the potassium chloride precipitate was filtered off and washed with benzene. The filtrate was washed three times with water and dried over magnesium sulfate. The solution was then filtered and the solvent was removed from the filtrate by evaporation to yield 14.5 g. of O-ethyl S-(N-methoxy-N - methylcarbamylmethyl)phenylthiolothionophosphonate, a colorless liquid having a refractive index $n_D^{25}$ 1.5804.

Analysis for $C_{12}H_{18}NO_3PS_2$—Theory: N, 4.4%; P, 9.3%; S, 19.7%. Found: N, 4.4%; P, 9.7%; S, 20.0%.

A wide variety of other compounds useful in the method of this invention can be prepared in a manner similar to that detailed above. In the following examples are given the starting materials which can be used to prepare the indicated named compounds.

EXAMPLE 6

Potassium cyclohexyl phenylthiolothionophosphonate +N - methoxy - N - isopropyl - α - chloroacetamide=O-cyclohexyl S - (N - methoxy - N - isopropylcarbamylmethyl)phenylthiolothionophosphonate.

EXAMPLE 7

Potassium n-hexyl phenylthiolothionophosphonate+N-methoxy-N-isopropyl - α - chloroacetamide=O - n - hexyl S - (N - methoxy - N - isopropylcarbamylmethyl)phenylthiolothionophosphonate.

EXAMPLE 8

Potassium n-butyl phenylthiolothionophosphonate+N-methoxy - N - isopropyl - α - chloroacetamide=O - n-butyl S - (N - methoxy - N - isopropylcarbamylmethyl) phenylthiolothionophosphonate.

EXAMPLE 9

Potassium sec - butyl phenylthiolothionophosphonate +N - methoxy - N - isopropyl - α - chloroacetamide=O-sec - butyl S - (N - methoxy - N - isopropylcarbamylmethyl)phenylthiolothionophosphonate.

EXAMPLE 10

Potassium tert - butyl phenylthiolothionophosphonate +N - methoxy - N - isopropyl - α - chloroacetamide=O-tert-butyl S - (N - methoxy - N-isopropylcarbamylmethyl) phenylthiolothionophosphonate.

EXAMPLE 11

Potassium ethyl 4-chlorophenylthiolothionophosphate +N - methoxy - N - isopropyl - α - chloroacetamide=O-ethyl S - (N-methoxy-N-isopropylcarbamylmethyl)4-chlorophenylthiolothionophosphonate.

EXAMPLE 12

Potassium ethyl 2,4 - dichlorophenylthiolothionophosphonate+N - methoxy - N - isopropyl - α - chloroacetamide=O-ethyl S-(N-methoxy-N-isopropylcarbamylmethyl)-2,4-dichlorophenylthiolothionophosphonate.

EXAMPLE 13

Potassium ethyl 2,4 - dimethylphenylthiolothionophosphonate+N - methoxy - N - isopropyl - α - chloroacetamide=O-ethyl S-(N-methoxy-N-isopropylcarbamylmethyl)-2,4-dimethylphenylthiolothionophosphonate.

EXAMPLE 14

Potassium ethyl 2-methyl-4-chlorophenylthiolothionophosphonate+N - methoxy - N - isopropyl - α - chloroacetamide=O-ethyl S-(N-methoxy-N-isopropylcarbamylmethyl) - 2-methyl - 4 - chlorophenylthiolothionophosphonate.

EXAMPLE 15

Potassium ethyl 2,4,5-trichlorophenylthiolothionophosphonate+N - methoxy - N - isopropyl - α - chloroacetamide=O-ethyl S-(N-methoxy-N-isopropylcarbamylmethyl)-2,4,5-trichlorophenylthiolothionophosphonate.

EXAMPLE 16

Potassium ethyl phenylthiolothionophosphonate+N-ethoxy-N-ethyl-α-chloroacetamide=O-ethyl S-(N-ethoxy-N-ethylcarbamylmethyl)phenylthiolothionophosphonate.

EXAMPLE 17

Potassium ethyl phenylthiolothionophosphonate+N-isopropoxy-N-ethyl-α-chloroacetamide=O-ethyl S - (N - isopropoxy - N - ethylcarbamylmethyl)phenylthiolothionophosphonate.

EXAMPLE 18

Potassium ethyl phenylphosphonate+N-methoxy-N-isopropyl-α-chloroacetamide=O-ethyl S-(N-methoxy-N-isopropylcarbamylmethyl)phenylphosphonate.

EXAMPLE 19

Potassium ethyl phenylthionophosphonate+N-methoxy-N-isopropyl-α-chloroacetamide=O - ethyl S-(N-methoxy-N-isopropylcarbamylmethyl)phenylthionophosphonate.

EXAMPLE 20

Potassium ethyl phenylthiolophosphonate+N-methoxy-N-isopropyl-α-chloroacetamide=O - ethyl S-(N-methoxy-N-isopropylcarbamylmethyl)phenylthiolophosphonate.

For practical use as herbicides, insecticides and miticides the compounds of this invention are generally incorporated into herbicidal, insecticidal and miticidal compositions which comprise an inert carrier and a herbicidally, insecticidally or miticidally toxic amount of such a compound. Such compositions, which are usually known in the art as formulations, enable the active compound to be applied conveniently to the site of the weed, insect or mite infestation in any desirerd quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the locus of the weed, insect or mite infestation. The emulsifiers most commonly used in these concentrates are nonionic or mixtures of nonionic with anionic surface-active agents.

A typical composition according to this invention is illustrated by the following example, in which the quantities are in parts by weight.

EXAMPLE 21

Preparation of a dust

Product of Example 1 _____ 10
Powdered talc _____ 90

The above ingredients are mixed in a mechanical grinder-blender and are ground until a homogeneous, free-flowing dust of the desired particle size is obtained. This dust is suitable for direct application to the site of the weed infestation.

The compounds of this invention can be applied in any manner recognized by the art. The concentration of the new compounds of this invention in the compositions will vary greatly with the type of formulation and the purpose for which it is designed, but generally the compositions will comprise from about 0.05 to about 95 percent by weight of the active compounds of this invention. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as pigweed, lamb's-quarters, yellow foxtail, crabgrass, wild mustard, French-weed, ryegrass, goosegrass, chickweed, and smartweed; biennials such as wild carrot, great burdock, mullein, round-leaved mallow, blue thistle, bull thistle, hound's tongue, moth mullein, and purple star thistle; or perennials such as white cockle, perennial ryegrass, quackgrass, Johnson grass, Canada thistle, hedge bindweed, Bermuda grass, sheep sorrel, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively non-toxic to many beneficial plants. The method of this invention for the control of weeds comprises contacting the locus of said weeds with a herbicidal composition comprising an inert carrier and as the essential active ingredient, in a quantity which is herbicidally toxic to said weeds, a compound of this invention. The exact amount of compound required will depend on a variety of factors, including the hardiness of the particular weed species, weather, method of application, the kind of beneficial plants in the same area, and the like. Thus, while the application of up to only about one or two ounces of an active compound per acre may be sufficient for good control of a light infestation of weeds growing under adverse conditions, the application of one pound or more of active compound per acre may be required for good control of a dense infestation of hardy weeds growing under favorable conditions.

The herbicidal toxicity of the new compounds of this invention can be illustrated by many of the established testing techniques known to the art. For example, in one series of experiments, the test compounds formulated as aqueous emulsions were sprayed at various dosages on the surface of soil which had been seeded less than twenty-four hours earlier with seeds of crop plants and weeds. After spraying, the soil containers were placed in the greenhouse and provided with supplementary light and heat as required and daily or more frequent watering. The severity of injury to each crop and weed was determined 15 to 20 days after the soil treatments. The severity of injury was rated on a 0 to 10 scale as follows: 0=no injury; 1, 2=slight injury; 3, 4=moderate injury; 5, 6=moderately severe injury; 7, 8, 9=severe injury; 10=death. Some of the results of these tests are presented in the following tables:

TABLE I.—CRABGRASS

| Test Chemical | Concn.* | Injury Rating |
|---|---|---|
| O-methyl S-(N-methoxy-N-isopropylcarbamyl-methyl)phenylthiolothionophosphonate | 8 | 9 |
| O-ethyl S-(N-methoxy-N-isopropylcarbamyl-methyl)phenylthiolothionophosphonate | 8 | 9 |
| O-n-propyl S-(N-methoxy-N-isopropylcarbamyl-methyl)phenylthiolothionophosphonate | 8 | 10 |
| O-isopropyl S-(N-methoxy-N-isopropylcarbamyl-methyl)phenylthiolothionophosphonate | 8 | 9 |
| O-ethyl S-(N-methoxy-N-methylcarbamyl-methyl)phenylthiolothionophosphonate | 8 | 9 |
| O-cyclohexyl S-(N-methoxy-N-isopropylcarbamylmethyl)phenylthiolothionophosphonate | 8 | 8 |

*Concentration is in lbs. actual test chemical per acre.

TABLE II.—BARNYARD GRASS

| Test Chemical | Concn.* | Injury Rating |
|---|---|---|
| O-methyl S-(N-methoxy-N-isopropylcarbamyl-methyl)phenylthiolothionophosphonate | 8 | 9 |
| O-ethyl S-(N-methoxy-N-isopropylcarbamyl-methyl)phenylthiolothionophosphonate | 8 | 10 |
| O-n-propyl S-(N-methoxy-N-isopropylcarbamyl-methyl)phenylthiolothionophosphonate | 8 | 10 |
| O-isopropyl S-(N-methoxy-N-isopropylcarbamyl-methyl)phenylthiolothionophosphonate | 8 | 10 |
| O-ethyl S-(N-methoxy-N-methyl-carbamyl-methyl)phenylthiolothionophosphonate | 8 | 9 |
| O-cyclohexyl S-(N-methoxy-N-isopropylcarbamylmethyl)phenylthiolothionophosphonate | 8 | 8 |

TABLE III.—FOXTAIL

| Test Chemical | Concn.* | Injury Rating |
|---|---|---|
| O-methyl S-(N-methoxy-N-isopropylcarbamyl-methyl)phenylthiolothionophosphonate | 8 | 10 |
| O-ethyl S-(N-methoxy-N-isopropylcarbamyl-methyl)phenylthiolothionophosphonate | 8 | 9 |
| O-n-propyl S-(N-methoxy-N-isopropylcarbamyl-methyl)phenylthiolothionophosphonate | 8 | 9 |
| O-isopropyl S-(N-methoxy-N-isopropylcarbamyl-methyl)phenylthiolothionophosphonate | 8 | 9 |
| O-ethyl S-(N-methoxy-N-methyl-carbamyl-methyl)phenylthiolothionophosphonate | 8 | 9 |

TABLE IV.—RYEGRASS

| Test Chemical | Concn.* | Injury Rating |
|---|---|---|
| O-methyl S-(N-methoxy-N-isopropylcarbamyl-methyl)phenylthiolothionophosphonate | 8 | 9 |
| O-ethyl S-(N-methoxy-N-isopropylcarbamyl-methyl)phenylthiolothionophosphonate | 8 | 9 |
| O-n-propyl S-(N-methoxy-N-isopropylcarbamyl-methyl)phenylthiolothionophosphonate | 8 | 8 |
| O-isopropyl S-(N-methoxy-N-isopropylcarbamyl-methyl)phenylthiolothionophosphonate | 8 | 9 |
| O-ethyl S-(N-methoxy-N-methyl-carbamyl-methyl)phenylthiolothionophosphonate | 8 | 8 |

The new compounds of this invention can be used in many ways for the control of insects. Insecticides which are to be used as stomach poisons or protective materials can be applied to the surface on which the insects feed or travel. Insecticides which are to be used as contact poisons or eradicants can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using inseticides are based on the fact that almost all the injury done by insects is a direct or indirect result of their attempts to secure food. Indeed, the large number of destructive insects can be classified broadly on the basis of their feeding habits. There are, for example, the chewing insects such as the Mexican bean beetle, the southern armyworm, cabbageworms, grasshoppers, the Colorado potato beetle, the cankerworm, and the gypsy worm. There are also the piercing-sucking insects, such as the pea aphid, the house fly, the chinch bug, leafhoppers, and plant bugs.

Another group of insects comprises the internal feeders. These include borers such as the European corn borer and the corn earworm; worms or weevils such as the coddling moth, cotton boll weevil, plum curculio, melonworm, and the apple maggot; leaf miners such as the apple leaf miner and the beet leaf miner; and gall insects such as the wheat jointworm and grape phylloxera. Insects which attack below the surface of the ground are classified as subterranean insects and include such destructive pests as the wooly apple aphid, the Japanese beetle, and the corn rootworm.

Mites and ticks are not true insects. Many economically important species of mites and ticks are known, including the red spider mite, the strawberry spider mite, the cattle tick, and the poultry mite. Chemicals useful for the control of mites are often called miticides.

The quantity of active compound of this invention to be used for insect control will depend on a variety of factors, such as the specific insect involved, intensity of the infestation, weather, type of environment, type of formation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

In one set of experiments designed to show the insecticidal utility of the compounds of the present invention, the test compounds were formulated by dissolving the compounds in acetone and dispersing the acetone solution in distilled water containing 0.2% by volume of alkyl aryl polyether alcohol type emulsifier.

In one experiment, fifty adult houseflies of the CSMA strain were placed in a 2-inch by 5-inch diameter stainless steel cage having screening (14 mesh) at its top and bottom. The flies were sprayed with the above formulation at the concentration indicated below, and the mortality was observed 2 hours after spraying. In this experiment, the results were as follows:

TABLE V

| Test Chemical | Concn.* | Percent Mortality |
|---|---|---|
| O-ethyl S-(N-methoxy-N-isopropylcarbamylmethyl)phenylthiolothionophosphonate | .35 | 100 |
| O-ethyl S-(N-methoxy-N-methylcarbamylmethyl)phenylthiolothionophosphonate | .35 | 100 |
| O-methyl S-(N-methoxy-N-isopropylcarbamylmethyl)phenylthiolothionophosphonate | .35 | 100 |
| O-isopropyl S-(N-methoxy-N-isopropylcarbamylmethyl)phenylthiolothionophosphonate | .35 | 100 |
| Control | 0 | 0 |

*Concentration in percent actual test chemical (weight/volume liquid sprayed).

The insecticidal utility of the compounds of this invention was further illustrated by additional experiments carried out for the control of insects by feeding. In this experiment, Lima bean leaves sprayed on their top and bottom surfaces with the above formulation at the concentrations indicated below were offered to ten larvae of the Mexican bean beetle (late second instar stage) for a feeding period of 48 hours. After this period the mortality was observed. In this experiment, the results were as follows:

TABLE VI

| Test Chemical | Concn.* | Percent Mortality |
|---|---|---|
| O-ethyl S-(N-methoxy-N-isopropylcarbamylmethyl)phenylthiolothionophosphonate | .35 | 100 |
| Do | .10 | 100 |
| O-ethyl S-(N-methoxy-N-methylcarbamylmethyl)phenylthiolothionophosphonate | .35 | 100 |
| Do | .10 | 100 |
| O-methyl S-(N-methoxy-N-isopropylcarbamylmethyl)phenylthilothionophosphonate | .35 | 100 |
| Do | .10 | 100 |
| O-isopropyl S-(N-methoxy-N-isopropylcarbamylmethyl)phenylthiolothionophosphonate | .35 | 100 |
| Do | .10 | 100 |
| Control | 0 | 0 |

*Concentration in percent actual test chemical (weight/volume liquid sprayed).

In another test, insecticidal utility was exhibited by spraying Lima bean leaves on their top and bottom surfaces with the above formulation at the concentration indicated below. These leaves were offered to ten larvae of the southern armyworm (late third instar stage) for a feeding period of 48 hours. After this period the mortality was observed. The results were as follows:

TABLE VII

| Test Chemical | Concn.* | Percent Mortality |
|---|---|---|
| O-ethyl S-(N-methoxy-N-isopropylcarbamylmethyl)phenylthiolothionophosphonate | .35 | 100 |
| O-ethyl S-(N-methoxy-N-methylcarbamylmethyl)phenylthiolothionophosphonate | .35 | 100 |
| O-methyl S-(N-methoxy-N-isopropylcarbamylmethyl)phenylthiolothionophosphonate | .35 | 100 |
| O-isopropyl S-(N-methoxy-N-isopropylcarbamylmethyl)phenylthiolothionophosphonate | .35 | 100 |
| Control | 0 | 0 |

*Concentration in percent actual test chemical (weight/volume liquid sprayed).

In still another test, the utility of the compound of this invention as an insecticide was further shown by spraying adult pea aphids with the above formulation containing the indicated amount of test chemical, transferring the aphids to pea plants also sprayed with the formulation, and observing the mortality rate after 48 hours.

TABLE VIII

| Test Chemical | Concn.* | Percent Mortality |
|---|---|---|
| O-ethyl S-(N-methoxy-N-isopropylcarbamylmethyl)phenylthiolothionophosphonate | .35 | 100 |
| Do | .10 | 100 |
| O-ethyl S-(N-methoxy-N-methylcarbamylmethyl)phenylthiolothionophosphonate | .35 | 100 |
| Do | .10 | 100 |
| O-methyl S-(N-methoxy-N-isopropylcarbamylmethyl)phenylthiolothionophosphonate | .35 | 100 |
| Do | .10 | 100 |
| O-isopropyl S-(N-methoxy-N-isopropylcarbamylmethyl)phenylthiolothionophosphonate | .35 | 100 |
| Do | .10 | 100 |
| Control | 0 | 0 |

*Concentration in percent actual test chemical (weight/volume liquid sprayed).

The utility of the compounds of the present invention as miticides was illustrated in experiments for the control of strawberry spider mites (*Tetranychus atlanticus*). In these experiments Lima bean plants previously infested with from 50 to 100 adults of the mites were dipped into the formulations and held for five days. Thereafter, the adult mortality was observed. The results were as follows:

TABLE IX

| Test Chemical | Concn.* | Percent Mortality |
|---|---|---|
| O-ethyl S-(N-methoxy-N-isopropylcarbamylmethyl)phenylthiolothionophosphonate | .35 | 100 |
| Do | .10 | 100 |
| O-ethyl S-(N-methoxy-N-methylcarbamylmethyl) phenylthiolothionophosphonate | .35 | 100 |
| Do | .10 | 100 |
| O-methyl S-(N-methoxy-N-isopropylcarbamylmethyl)phenylthiolothionophosphonate | .35 | 100 |
| Do | .10 | 100 |
| O-isopropyl S-(N-methoxy-N-isopropylcarbamylmethyl)phenylthiolothionophosphonate | .35 | 100 |
| Do | .10 | 100 |
| Control | 0 | 0 |

*Concentration in percent actual test chemical (weight/volume liquid)

I claim:
1. A compound of the formula

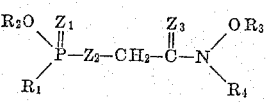

wherein $R_1$ is selected from the group consisting of phenyl and substituted phenyl wherein the substituents are selected from the group consisting of alkyl, chlorine, and mixtures thereof; $R_2$, $R_3$, and $R_4$ are independently selected alkyl groups containing 1 to 10 carbon atoms; and $Z_1$, $Z_2$, and $Z_3$ are independently selected from the group consisting of sulfur and oxygen.

2. A compound of the formula

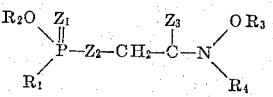

wherein $R_1$ is selected from the group consisting of phenyl and substituted phenyl wherein the substituents are selected from the group consisting of alkyl containing 1 to 10 carbon atoms, chlorine and mixtures thereof; $R_2$, $R_3$, and $R_4$ are independently selected alkyl groups containing 1 to 4 carbon atoms; and $Z_1$, $Z_2$, and $Z_3$ are independently selected from the group consisting of sulfur and oxygen.

3. O-ethyl S-(N-methoxy-N-isopropylcarbamylmethyl) phenylthiolothionophosphonate.

4. O-methyl S-(N-methoxy-N-isopropylcarbamylmethyl)phenylthiolothionophosphonate.

5. O-n-propyl S-(N-methoxy-N-isopropylcarbamylmethyl)phenylthiolothionophosphonate.

6. O-isopropyl S-(N-methoxy-N-isopropylcarbamylmethyl)phenylthiolothionophosphonate.

7. O-ethyl-S-(N-methoxy-N-methylcarbamylmethyl)-phenylthiolothionophosphonate.

References Cited

FOREIGN PATENTS

| 1,141,989 | 1/1963 | Germany. |
| 923,702 | 4/1963 | Great Britain. |

CHARLES B. PARKER, *Primary Examiner.*

A. H. SUTTO, *Assistant Examiner.*

UNITED STATES PATENT OFFICE
CERTIFICATE OF CORRECTION

Patent No. 3,371,132                      February 27, 1968

Sidney B. Richter

It is certified that error appears in the above identified patent and that said Letters Patent are hereby corrected as shown below:

Column 3, lines 59 and 60, "0.234", each occurrence, should read -- 0.0234 --. Column 4, lines 6 and 25, "135", each occurrence, should read -- 13.5 --. Column 5, lines 61 and 66, "S-(N-methoxy", each occurrence, should read -- 0-(N-methoxy --. Column 10, lines 60 to 64, that portion of the formula reading

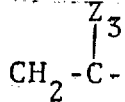     should read     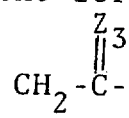

Signed and sealed this 29th day of July 1969.

(SEAL)

Attest:

Edward M. Fletcher, Jr.                      WILLIAM E. SCHUYLER, JR.

Attesting Officer                              Commissioner of Patents